US008606471B2

(12) United States Patent
Filla et al.

(10) Patent No.: US 8,606,471 B2
(45) Date of Patent: Dec. 10, 2013

(54) METHOD AND A SYSTEM FOR OPERATING A WORKING MACHINE

(75) Inventors: Reno Filla, Eskilstuna (SE); Joakim Unnebäck, Eskilstuna (SE); Bo Vigholm, Stora Sundby (SE); Stefan Johansson, Ransta (SE); Joakim Fröberg, Västeras (SE)

(73) Assignee: Volvo Construction Equipment AB, Eskilstuna (SE)

( * ) Notice: Subject to any disclaimer, the term of this patent is extended or adjusted under 35 U.S.C. 154(b) by 292 days.

(21) Appl. No.: 12/990,498

(22) PCT Filed: May 27, 2008

(86) PCT No.: PCT/SE2008/000359
§ 371 (c)(1),
(2), (4) Date: Oct. 30, 2010

(87) PCT Pub. No.: WO2009/145681
PCT Pub. Date: Dec. 3, 2009

(65) Prior Publication Data
US 2011/0060504 A1    Mar. 10, 2011

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC .............................................. 701/50; 701/1

(58) Field of Classification Search
USPC ........................................................ 701/50
See application file for complete search history.

(56) References Cited

U.S. PATENT DOCUMENTS

| 4,630,685 | A | * | 12/1986 | Huck et al. ........................ 172/7 |
| 5,584,346 | A | * | 12/1996 | Sakamoto et al. .............. 172/4.5 |
| 5,621,643 | A | * | 4/1997 | Nakagami et al. .............. 701/50 |
| 5,862,868 | A | * | 1/1999 | Yamamoto et al. ............... 172/2 |
| 6,584,710 | B1 | * | 7/2003 | Lin et al. ........................ 37/348 |
| 6,643,577 | B1 | * | 11/2003 | Padgett et al. .................. 701/50 |
| 7,188,015 | B2 | * | 3/2007 | Lange et al. .................... 701/50 |

(Continued)

FOREIGN PATENT DOCUMENTS

| EP | 1288505 | A1 | 3/2003 |
| EP | 1505717 | A1 | 2/2005 |
| EP | 1571352 | A1 | 9/2005 |
| WO | 2007081275 | A1 | 7/2007 |

OTHER PUBLICATIONS

International Search Report for corresponding International Application PCT/SE2008/000360.

(Continued)

*Primary Examiner* — Bhavesh V Amin
(74) *Attorney, Agent, or Firm* — WRB-IP LLP (57) ABSTRACT

A method and a system for operating a working machine provided with a hydraulic system and an operator control adapted to command actuation of the hydraulic system is provided. The system includes a first control unit and a second control unit for moving an implement on the working machine and/or for steering the working machine. The method includes receiving first information regarding a status of the operator control, and determining at least one hydraulic system control information based on the first information and sending the determined hydraulic system control information to a second control unit which is adapted to control the hydraulic system accordingly.

16 Claims, 4 Drawing Sheets

(56) References Cited

U.S. PATENT DOCUMENTS

| | | |
|---|---|---|
| 2003/0125859 A1* | 7/2003 | Dix et al. .................... 701/50 |
| 2005/0001567 A1* | 1/2005 | Yoshimatsu ................. 318/34 |
| 2006/0089773 A1* | 4/2006 | Hendron ...................... 701/50 |
| 2006/0156713 A1 | 7/2006 | Kadlicko |
| 2006/0161324 A1* | 7/2006 | Ozawa et al. ................ 701/50 |

OTHER PUBLICATIONS

International Preliminary Report on Patentability for corresponding International Application PCT/SE2008/00036.

* cited by examiner

METHOD AND A SYSTEM FOR OPERATING A WORKING MACHINE

BACKGROUND AND SUMMARY

The invention relates to a method for operating a working machine provided with a hydraulic system for moving an implement on the working machine and/or for steering the working machine, and an operator control means, which is adapted to command actuation of the hydraulic system. The invention is further directed to a system for performing the method.

The invention is applicable on working machines within the field of industrial construction machines, in particular wheel loaders. Thus, the invention will be described with respect to a wheel loader. However, the invention is by no means limited to a particular working machine. On the contrary, the invention may be used in a plurality of heavy working machines, e.g. articulated haulers, trucks, bulldozers and excavators etc.

BACKGROUND

A working machine such as e.g. a wheel loader is generally provided with an internal combustion engine, a transmission line, driving wheels and a working hydraulic system.

The combustion engine provides power to the different functions of the wheel loader. In particular, the combustion engine provides power to the transmission line, to the working hydraulic system and to the electrical system of the wheel loader.

The transmission line transfers torque from the combustion engine to the driving wheels of the loader.

The working hydraulic system is used for lifting operations and/or for steering the wheel loader. For this purpose there are at least one hydraulic working cylinder arranged in the wheel loader for lifting and lowering a lifting arm unit, on which a bucket or other type of attachment or working tool is mounted (for example forks). By use of another hydraulic working cylinder, the bucket can also be tilted or pivoted. Further hydraulic cylinders known as steering cylinders are arranged to turn the wheel loader by means of relative movement of a front and rear body part of the wheel loader.

Traditionally the piston in a hydraulic working cylinder has been actuated by means of a hydraulic pump being arranged to communicate pressurised hydraulic oil in to and/or out of the working cylinder. The hydraulic pump in these traditional solutions is mechanically actuated (e.g. rotated) by the combustion engine of the wheel loader via a power outlet coupled to the combustion engine directly or coupled to the transmission line of the wheel loader. The speed of the piston is controlled indirectly via controlling the hydraulic fluid flow via proportional valves. However, in modern working machines such as wheel loaders various solutions have been proposed wherein an electrical motor is used to actuate the piston of the hydraulic working cylinder. This provides a series of advantages, e.g. a mechanical decoupling of the transmission line from the hydraulic pumps, an improved modularity and also a more flexible and precise control of the pump functionality etc.

However, known solutions do not utilise all the benefits that becomes possible when an electrical motor is used to actuate the piston of the hydraulic working cylinder.

It is desirable therefore to provide an improved modularity with respect to the units in the system utilized to control the hydraulic system of the working machine. It is also desirable to provide a relaxation or elimination of the restrictions imposed on the design of the units in the system utilized to control the hydraulic system of the working machine.

According to an aspect of the present invention, a method is provided for operating a working machine provided with a hydraulic system for moving an implement on the working machine and/or for steering the working machine, and driver controlled operator controls, which is adapted to command actuation of the hydraulic system. The method is performed in a first control unit and comprises the steps of obtaining first information regarding a status of the driver controlled operator controls, determining at least one hydraulic system control information based on the first information, and sending said determined hydraulic system control information to a second control unit, which is adapted to control the hydraulic system accordingly.

According to another aspect of the present invention, a system is provided for operating a working machine provided with a hydraulic system and driver controlled operator controls adapted to command actuation of the hydraulic system. The operating system comprises a first control unit and a second control unit for moving an implement on the working machine and/or for steering the working machine. The first control unit is adapted to obtain first information regarding a status of the driver controlled operator controls, and to determine at least one hydraulic system control information based on the first information, and to send said determined hydraulic system control information to the second control unit. The second control unit is adapted to control the hydraulic system according to the hydraulic system control information received from the first control unit.

Using a first control unit for controlling a second control unit by sending information from the first control unit to the second control unit to create preconditions under which the second control unit is allowed to operate makes the design and operation of the first and second units less dependent on each other or even substantially independent of each other. Hence, the modularity is increased. For example, the first control unit may be configured for controlling how to interpret/manipulate an operator lever input to cylinder speed with due regard to the machine operating characteristics, power (fuel) consumption etc in a certain operating condition. The specific control of the cylinder is then performed via the second control unit based on operation information from the first control unit.

It should be emphasized that the term "comprises/comprising" when used in this specification is taken to specify the presence of stated features, integers, steps or components, but does not preclude the presence or addition of one or more other features, integers, steps, components or groups thereof.

Further advantages and advantageous features of the invention are disclosed in the following description and in the dependent claims.

BRIEF DESCRIPTION OF THE DRAWINGS

A more detailed description of the present invention is given below with reference to a plurality of exemplifying embodiments as illustrated in the appended figures, in which.

DETAILED DESCRIPTION

Structure

A Wheel Loader

Figure 1:
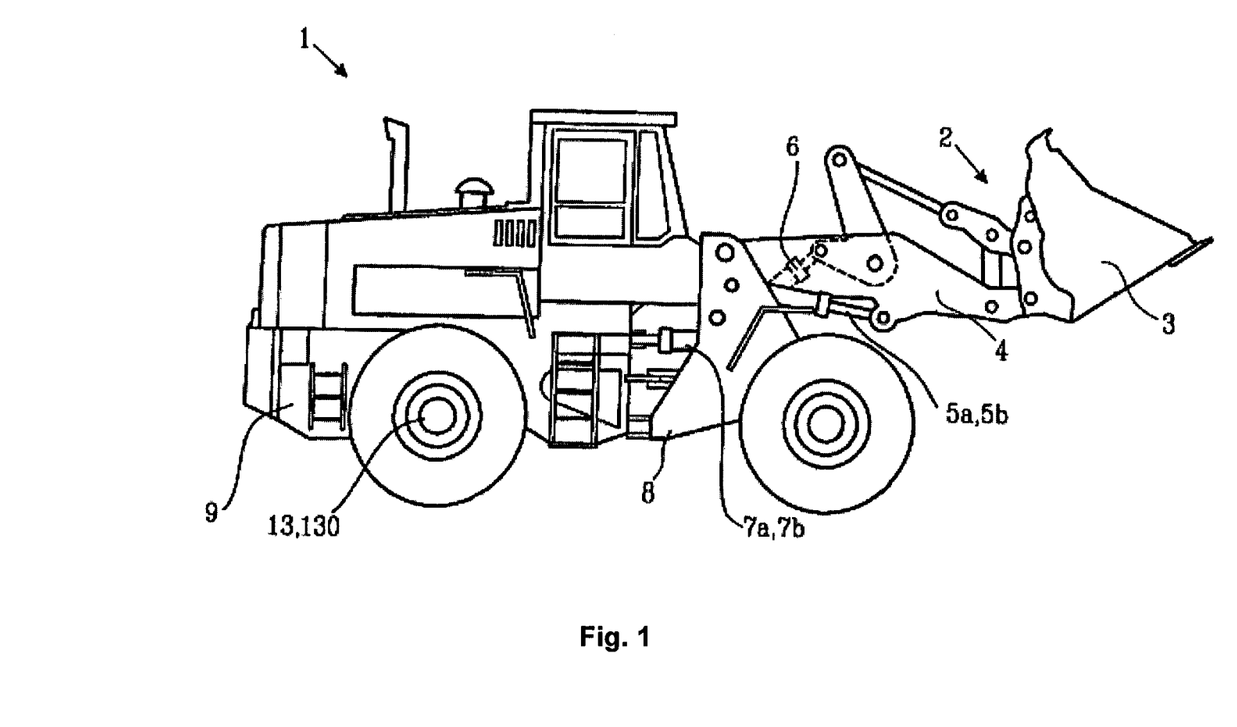
FIG. 1 is a lateral view illustrating a wheel loader having a bucket for loading operations and a working hydraulic system for operating the bucket and steering the wheel loader.

FIG. 1 is an illustration of an exemplifying wheel loader 1 having an implement 2 in the form of a bucket 3. The bucket 3 is arranged on an arm unit 4 for lifting and lowering the bucket 3. The bucket 3 can also be tilted or pivoted relative to the arm unit 4. For this purpose the wheel loader 1 is provided with a hydraulic system 140 comprising at least one hydraulic pump (not shown in FIG. 1) and working cylinders/actuators 5a, 5b, 6 for lifting and lowering of the arm unit 4, and for tilting or pivoting the bucket 3. In addition, the working hydraulic system comprises working cylinders 7a, 7b for turning the wheel loader 1 by means of relative movement of a front body 8 and a rear body 9. These features of the wheel loader 1 and variations thereof are well known to those skilled in the art and they need no detailed explanation.

A Working Hydraulic System

Figure 2:
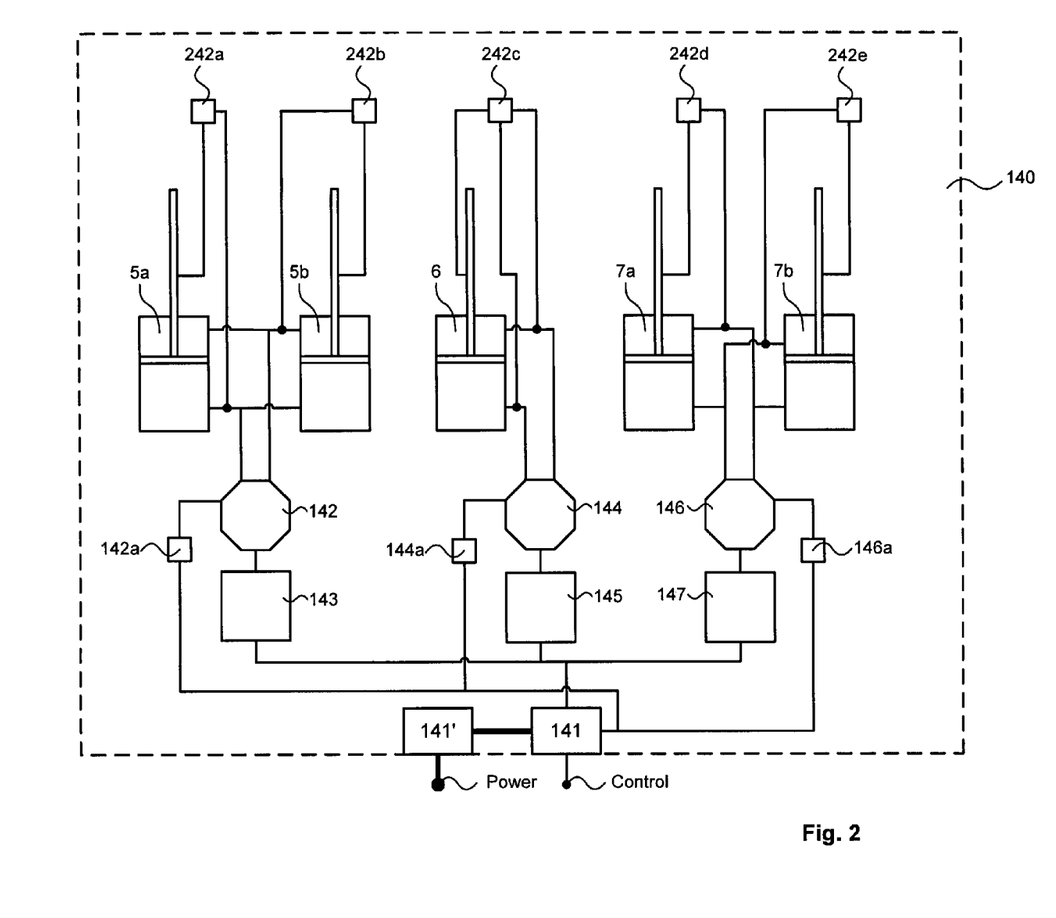
FIG. 2 is a schematic illustration of a hydraulic system 140 for a wheel loader.

FIG. 2 is a schematic illustration of an exemplifying hydraulic system 140. The embodiment in FIG. 2 comprises two working cylinders known as lifting cylinders 5a, 5b. The lifting cylinders 5a, 5b are arranged for lifting and lowering the arm unit 4. A further working cylinder known as tilting cylinder 6 is arranged for tilting-in or tilting-out the bucket 3 relative to the arm unit 4. In addition, two working cylinders known as the steering cylinders 7a, 7b are arranged for steering the wheel loader 1. Three hydraulic pumps 142, 144, 146 supply the hydraulic cylinders with hydraulic oil, such that a first pump 142 supplies cylinders 5a, 5b, a second pump 144 supplies cylinder 6 and a third pump supplies cylinders 7a, 7b. An operator of the wheel loader 1 controls the working cylinders by means of operator controls 220 (see FIG. 3) connected to a hydraulic system control unit (first control unit) 200 (see FIG. 3). Preferably the cylinders 5a, 5b, 6, 7a and 7b schematically illustrated in FIG. 2 correspond the cylinders 5a, 5b, 6, 7a and 7b shown in FIG. 1.

Furthermore, it is preferred that each hydraulic cylinder 5a, 5b, 6, 7a, 7b is provided with an external sensor arrangement, i.e. cylinder 5a is provided with a first sensor arrangement 242a, cylinder 5b is provided with a second sensor arrangement 242b, cylinder 6 is provided with a third sensor arrangement 242c, cylinder 7a is provided with a fourth sensor arrangement 242d and cylinder 7b is provided with a fifth sensor arrangement 242e. It is preferred that the sensor arrangements 242a-242e comprises a position sensor or similar that is arranged to operatively detect the current position of the piston of the hydraulic cylinder, e.g. with respect to one or both of the end positions of the piston. As is well known, changes in the position of a piston can then be used to calculate the speed and acceleration of the piston in question and the other way around. Furthermore, the sensor arrangements 242a-242e may comprise a strain sensor or similar (e.g. a strain gauge) and/or a torque sensor or similar that is arranged to operatively detect the current strain of the piston in the hydraulic cylinder, which can be used to calculate the current force applied to the piston in question. Moreover, the sensor arrangements 242a-242e may comprise a pressure sensor or similar arranged to operatively detect the current pressure of the hydraulic oil in the hydraulic cylinder 5a, 5b, 6, 7a, 7b, which can be used to calculate the current force applied to the piston in question. The external sensor arrangements 242a-242e is preferably used by the external hydraulic system control unit 200 to close an outer slow control loop as will be described further below.

In addition the hydraulic system 140 comprises a first electrical machine 143 arranged to operatively actuate the first hydraulic pump 142, a second electrical machine 145 arranged to operatively actuate the second hydraulic pump 144 and a third electrical machine 147 arranged to operatively actuate the third hydraulic pump 146. The electrical machines 143, 145, 147 are connected to and controlled by a local machine control unit (second control unit) 141, which in turn is adapted to be operatively connected to and controlled by the hydraulic system control unit 200 as will be further described later. It is preferred that the electrical machines 143, 145, 147 are arranged to operate as motors for actuating the hydraulic pumps 142, 144, 146 (e.g. by a rotating and/or longitudinal movement).

Moreover, as can be seen in FIG. 2 it is preferred that each electric machine 143, 145, 147 and/or each hydraulic pump 142, 144, 146 is provided with an internal sensor arrangement 142a, 144a, 146a respectively, i.e. the first machine/pump 143/142 is provided with a first sensor arrangement 142a, the second machine/pump 145/144 is provided with a second sensor arrangement 144a, and the third machine/pump 147/146 is provided with a third sensor arrangement 146a. It is preferred that the sensor arrangements 142a-146a comprise a pressure sensor for operatively detect the current pressure of the hydraulic oil in the hydraulic pump 142, 144, 146 respectively. The sensor arrangements 142a-146a respectively may also comprise a sensor for measuring the rotational position of the electrical machines 143, 145, 147 respectively and/or the hydraulic pumps 142, 144, 146 respectively.

It is preferred that the machine control unit 141 is connected to the above described internal sensor arrangements 142a, 144a, 146a. This makes it possible for the machine control unit 141 to communicate with the sensor arrangements 142a, 144a, 146a and read out parameters detected by sensors in the sensor arrangements 142a, 144a, 146a.

Here, it is preferred that the machine control unit 141 sends commands to the electric machines 143, 145, 147 in the hydraulic system 140 and then reads the response from the machines 143, 145, 147 via said sensor arrangements 142a, 144a, 146a so as to close an inner loop for controlling the hydraulic system 140. it is also preferred that the inner loop has a fast response, i.e. a high gain or similar.

In addition, it is preferred that at least the electrical machine 143 and the electrical machine 145 are arranged operate as a generator for converting mechanical movements caused by forces exerted on the hydraulic oil by the leverage arm 4 (cylinder 5a, 5b) or the bucket 3 (cylinder 6) respectively to electrical energy. To this end it is preferred that the electrical power provided to and from the hydraulic system 140 is controlled by a local power-control unit 141', which in turn is controlled by the machine control unit 141 , e.g. by being connected to or comprised by the machine control unit 141.

The machine control unit 141 is arranged to operatively have a fast control of the electrical machines 143, 145, 147 and the hydraulic cylinders 5a, 5b, 6, 7a, 7b under the conditions slowly provided from the hydraulic system control unit 200. It is preferred that these controls at least comprises a control of the pressure in the hydraulic cylinders 5a, 5b, 6, 7a, 7b and a control of the power provided to and/or from the electrical machines 143, 145, 147. The control may also comprise a control of the rotational position and/or speed of the electrical machines 143, 145, 147. Such controls may require pressure sensors which e.g. may be an integral part of the hydraulic pumps 142, 144, 146 and/or a part of the hydraulic cylinders 5a, 5b, 6, 7a, 7b. It may also require a power meter and/or a voltage and/or ampere meter, which e.g. may be an integral part of any of the control units 141, 141'. In addition, it may require an angular position meter, which e.g. may be an integral part of the electrical machine 143, 145, 147.

The Hydraulic System, the Transmission Line and a Power Source etc

Figure 3:
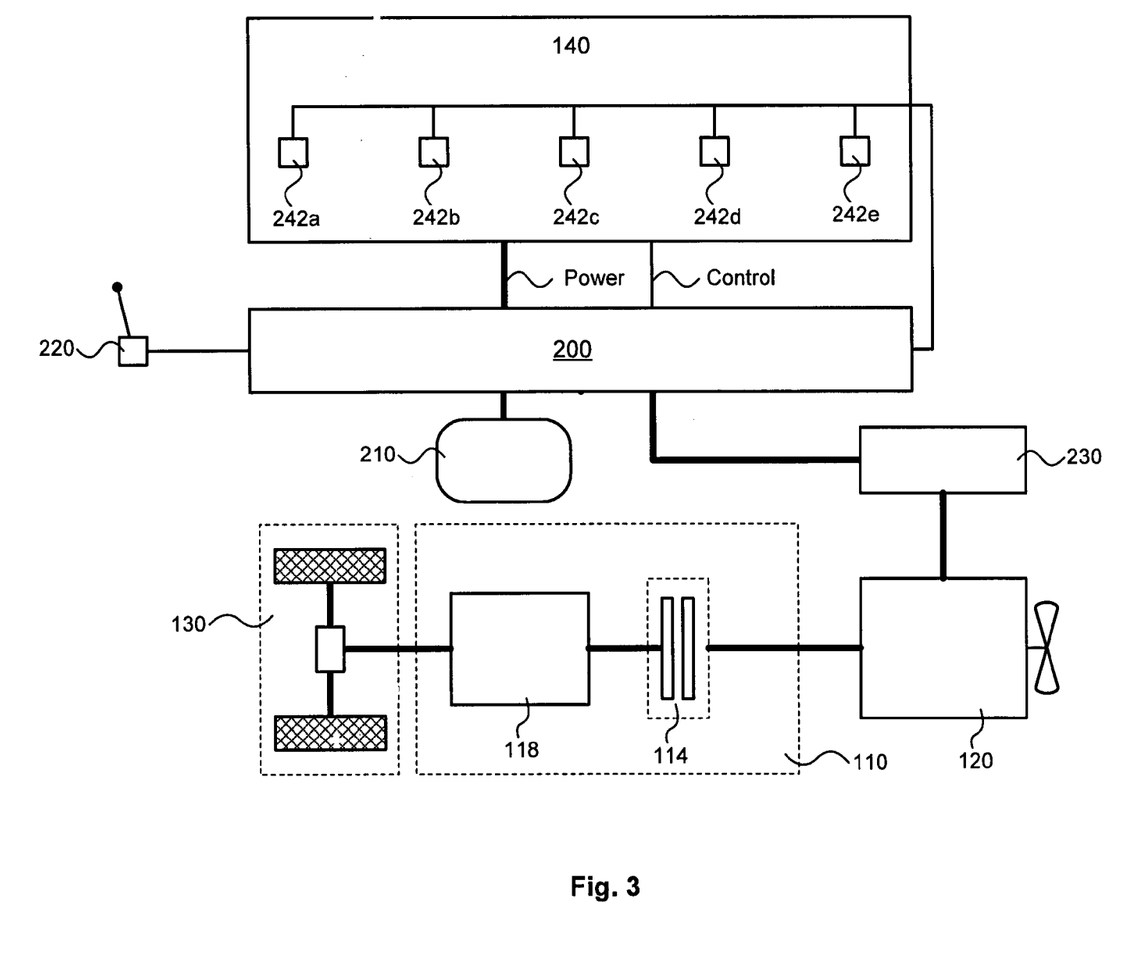
FIG. 3 is a schematic illustration of Ia. the wheel loader's transmission line 110, combustion engine 120, hydraulic system 140, hydraulic system control unit 200 and operator controls 220

FIG. 3 is a schematic illustration of i.a. a transmission line 110 of a wheel loader 1 according to an embodiment of the present invention. The internal combustion engine 120 of the wheel loader 1 is arranged at one end of the transmission line 110 and the driving wheels 130 of the wheel loader 1 are arranged at the other end of the transmission line 110. The term "driving wheel" is meant to comprise vehicle wheels for direct engagement with the ground as well as vehicle wheels for driving a ground engaging member, such as tracks, crawlers or similar. From FIG. 3 it can be readily understood that the combustion engine 120 is arranged to supply torque to the driving wheels 130 via the transmission line 110. Preferably the transmission line 110 comprises a gearbox 118 for varying the speed of the driving wheels 130 of the wheel loader 1 and for changing between forward and backward driving direction of the wheels 130. In addition, the transmission line 110 is preferably provided with a transmission unit 114 for reducing the mechanical interaction between the internal combustion engine 120 and the driving wheels 130, i.e. for providing slipping or skidding or even for temporally disengaging the combustion engine 120 from the driving wheels 130. The main purpose is to protect the engine 120 from sudden rapid changes in the working conditions of the gearbox 118 and the driving wheels 130. The transmission unit 114 is preferably a hydraulic clutch of the type called hydrodynamic torque converter.

It should be added that the combustion engine 120 can be replaced by some other power source, e.g. a power source in the form of a gas turbine or similar. In addition, the transmission line 110 may be fully or at least partly replaced by a hydraulic transmission or an electrical transmission. An electrical transmission may e.g. be implemented by means of cables or similar that supply power from an electrical power source to one or several electrical motors for operatively propelling the driving wheels 130. In this connection it may be preferred to replace the combustion engine 120 with an electrical power source, e.g. a fuel cell arrangement or similar, though this is by no means necessary.

As can be further seen in FIG. 3 the combustion engine 120 is mechanically connected to a generator 230, which is arranged to operatively provide electrical power to the electrical system of the wheel loader 1, as is well known in the art. The generator 230 is in turn connected to the hydraulic system control unit 200 being arranged to operatively control the working hydraulic system 140 as described above.

A Hydraulic System Control Unit

The hydraulic system control unit 200 is preferably implemented as one or several hardware units being arranged in one or several locations within the wheel loader 1 and being provided with the appropriate circuitry and software needed to accomplish the required functions, e.g. circuitry for communicating with sensors and other units, for switching and controlling electrical power, for processing and storing information or similar; and software for executing and controlling any required communication, switching, processing and storing etc. In addition, it is preferred that the hydraulic system control unit 200 is connected to a CAN-bus or possibly to a MOST-network or any other communication means that is used for enabling communication between different units in the wheel loader 1.

Some embodiments of the present invention may have a very simple hydraulic system control unit 200 comprising a simple on/off switch for controlling the machine control Unit 141 and hence the electrical machines 143, 145, 147 in the hydraulic system 140. Other embodiments may have a more sophisticated hydraulic system control unit 200 provided with substantial processing capabilities and advanced switching functions and power controlling functions for controlling the machine control unit 141 and the electrical machines 143, 145 147 depending on algorithms working on the operational status of the operator controls 220 and possibly on the operational status of the wheel loader 1, which e.g. may be obtained by the control unit 200 from the sensors 242a-242e arranged within the wheel loader 1 and/or from a CAN-bus or a Most-network or similar to which the control unit 200 is connected for communicating with other units of the wheel loader 1.

As can be seen in FIG. 3 it is preferred that the hydraulic system control unit 200 is connected to an electrical power storage arrangement 210 (e.g. a battery or a super capacitor similar), which is arranged so as to be operatively provided with electrical power from the generator 230 under the control of the hydraulic system control unit 200. It is also preferred that hydraulic system control unit 200 is connected to the hydraulic system 140. In this connection it is preferred that hydraulic system control unit 200 is connected to the machine control unit 141 of the system 140 for operatively controlling the electrical machines 143, 145, 147, and to the power-control unit 141' of the hydraulic system 140 for controlling the electrical power provided to the electrical machines 143, 145, 147 and possibly from the electrical machines 143, 145 as previously indicated above.

Furthermore, as already indicated above, it is preferred that the hydraulic system control unit 200 is connected to operator controls 220, e.g. via a CAN-bus or similar, for receiving commands from the driver of the wheel loader 1. The operator controls 220 may e.g. be one or several joy-sticks or similar for controlling the hydraulic pumps 142, 144 coupled to the lifting and tilting cylinders 5a, 5b, 6 as described above. The control 220 may also be a steering wheel or similar for controlling the pump 146 coupled to the steering cylinders 7a and 7b as described above. Naturally, other controls for controlling the hydraulic system 140 is clearly conceivable, e.g. such as control knobs and/or control switches etc for adjusting the operation condition of the working hydraulic system 140, e.g. directly setting one or several hydraulic limitation parameters as will be further discussed later.

It is also preferred that the hydraulic system control unit 200 is connected to the above described first, second, third, fourth and fifth external sensor arrangements 242a-242e, e.g. via a CAN-bus or similar. This makes it possible for the hydraulic system control unit 200 to communicate with the sensor arrangements 242a-242e and read out parameters detected by sensors in the sensor arrangements 242a-242e. Here, it is preferred that the control unit 200 sends command information and possibly limitation information to the machine control unit 141 of the hydraulic system 140 and then reads the response from the hydraulic system 140 via said sensor arrangements 242a-242e, so as to close an outer loop for controlling the machine control unit 141 and thus the hydraulic system 140. It is also preferred that the outer loop has a slow response, i.e. a low gain or similar.

Function

Above we have discussed the structure of preferred embodiments implemented in a working machine, i.e. in an exemplifying wheel loader 1. Amongst other things, the exemplifying wheel loader 1 comprises a hydraulic system 140 comprising at least one hydraulic pump 142, 144, 146 powered by an electrical machine 143, 145, 147 controlled by a machine control unit 141 for moving an implement 3 on the working machine 1 and/or for steering the working machine 1. In addition the hydraulic system 140 comprises operator controls 220 and a hydraulic system control unit 200 for controlling the operation of the machine control unit 141 and hence said electrical machine 143, 145, 147 of the hydraulic system 140.

In the introduction it was clarified that there is a particular need for a hydraulic system that makes it possible to more completely utilise the improved modularity accomplished when an electrical motor is used to actuate the piston of the hydraulic working cylinder. This has been accomplished by embodiments of the invention.

Particularly, using a direct control unit 141 for controlling the electrical machine and an indirect control unit 200 for controlling the direct control unit 141 has the advantage of enabling the direct control unit 141 and the indirect control unit 200 to be designed with less restrictions with respect to each other or even to be designed substantially independent from each other.

In addition, in using a direct control unit 141 for controlling the electrical machine and an independent indirect control unit 200 for controlling the direct control unit 141 has the advantage of enabling a first fast direct control by the direct control unit 141 of the electrical machine and hence the hydraulic pump and cylinder/actuator powered by the machine, and an indirect slow control by the indirect control unit 200 of the fast control unit 141. As is readily understood by a person skilled in the art, using a slow loop to control a fast loop has advantageous properties within the field of automatic control.

The attention is now directed to the function of an exemplifying embodiment of the present invention. The embodiment is described with reference to FIG. 1-3, and FIG. 4 showing a flowchart illustrating the steps of an exemplifying method for providing a more complete utilisation of the improved modularity accomplished when an electrical motor is to actuate the piston of the hydraulic working cylinder. The method is preferably performed by means of the hydraulic system control unit 200 as schematically illustrated in FIG. 3.

Figure 4:
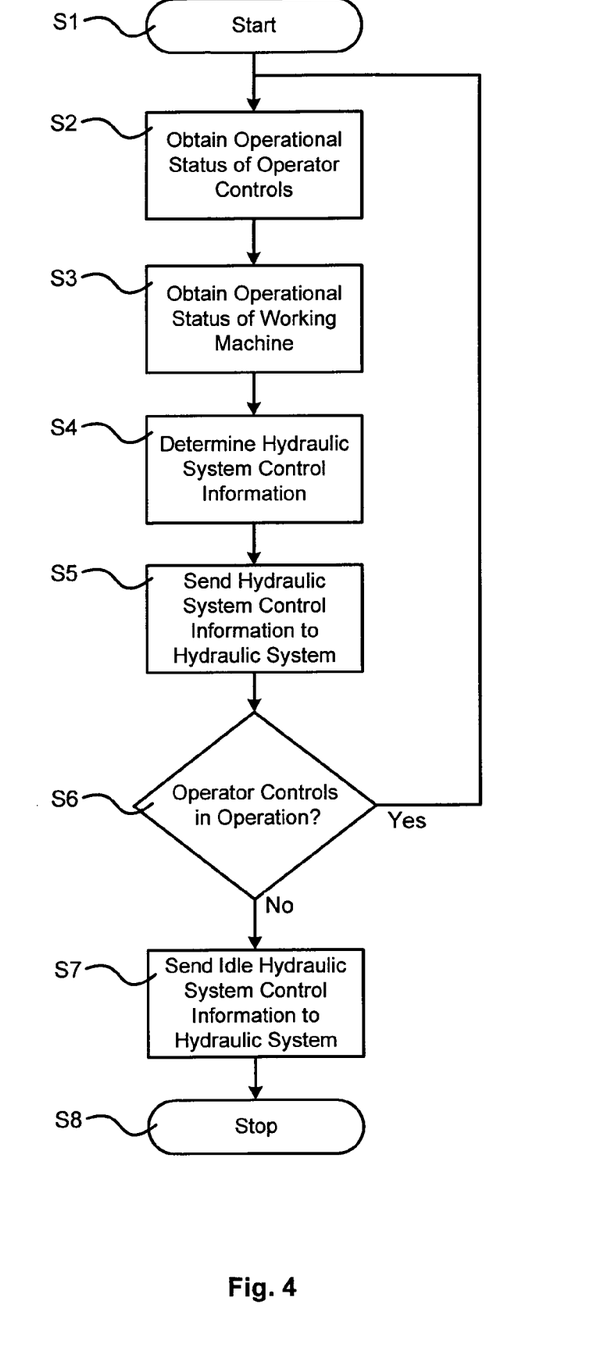
FIG. 4 is a flowchart illustrating an embodiment of the present invention.

In a first step S1 of the exemplifying method it is preferred that the wheel loader 1 is started so that the engine 120 is running and the generator 230 is producing electrical power. It is also preferred that the hydraulic system control unit 200 is started and diagnosed etc so as to be fully operational. Similarly, it is preferred that the hydraulic system 140 comprising the sensor arrangements 242a-242e is started and calibrated etc so as to be fully operational. It is also preferred that at least one initial hydraulic limitation parameter is sent from the hydraulic system control unit 200 to the hydraulic system 140 at start up of the wheel loader 1, or more preferably to the machine control unit 141 or similar of the hydraulic system 140. Other embodiments may alternatively have one or several initial hydraulic limitation parameters pre-stored in the hydraulic system 140, e.g. in the machine control unit 141 or similar. The nature of the hydraulic limitation parameters will be described in more detail below.

In a second step S2 of the exemplifying method it is preferred that the operational status of the operator controls 220 is obtained by the hydraulic system control unit 200. The status of the operator controls 220 may e.g. be obtained by the control unit 200 from a CAN-bus or a Most-network or similar to which the control unit 200 is connected for communicating with other units of the wheel loader 1. The status of the operator controls 220 may e.g. correspond to or being indicative of the position of one or several of; a knob, a control switch, a joystick or a steering wheel or similar.

In a third step S3 of the exemplifying method it is preferred that the operational status of the wheel loader 1 is obtained by the hydraulic system control unit 200. The operational status of the wheel loader 1 may be obtained by the control unit 200 from the sensors 242a-242e arranged within the wheel loader 1 and/or from a CAN-bus or a Most-network or similar to which the control unit 200 is connected for communicating with other units of the wheel loader 1. The status of the wheel loader 1 may e.g. correspond to or being indicative of one or several of; the status of the hydraulic system 140, the status of the combustion engine 120, the status of the transmission line 110, the status of the wheels 130, the status of the electrical power storage arrangement 210 or similar. The status of the wheel loader 1 may e.g. be obtained by the control unit 200 from the sensors 242a-242e arranged within the wheel loader 1 and/or from a CAN-bus or a Most-network or similar to which the control unit 200 is connected for communicating with other units of the wheel loader 1.

In a fourth step S4 of the exemplifying method it is preferred that at least one hydraulic system control information is determined depending on the obtained status of the operator controls 220 and possibly depending on the operational status of the wheel loader 1. The hydraulic system control information may comprise command information for controlling the hydraulic system 140, e.g. command information such as an actuator speed (i.e. the speed of the piston in any of the cylinders 5a, 5b, 6, 7a, 7b), an actuator force (N) and/or torque (Pa), a difference in volumetric flow rate over an actuator or a difference in pressure over an actuator or any other parameter corresponding to or being similar to those now mentioned.

The hydraulic system control information may e.g. be obtained by look-up tables and/or by mathematical relations or expressions or similar wherein the obtained values from the operator controls 220 and possibly the operational status of the wheel loader 1 are converted or translated or similar into hydraulic system control information. The hydraulic system control information will then be sent by the hydraulic system control unit 200 for execution to the machine control unit 141 as will be further elaborated below in the next fifth step S5.

Before we proceed it should also be carefully emphasized that the hydraulic system control information may comprise hydraulic limitation parameters or similar limitation information. Hydraulic limitation parameters may e.g. be parameters corresponding to minimum hydraulic actuator acceleration or similar. Similarly, hydraulic limitation parameters may also e.g. be parameters corresponding to minimum hydraulic actuator jerk or similar. The minimum values of different hydraulic limitation parameters will La. ensure that the hydraulic pumps do not react too slowly when the driver actuates the operator controls 220. Such minimum values may e.g. be set based on empirical knowledge and/or adjusted by the driver actuating a suitable control among the operator controls 220. Here it is preferred that hydraulic limitation parameters are determined and sent to raise the previously set minimum values, e.g. when a more aggressive driving and actuation have been demanded by the driver. It is also preferred that hydraulic limitation parameters are determined and sent so as to lower the previously set minimum values, e.g. when a softer driving and actuation have been demanded by the driver.

Moreover, hydraulic limitation parameters may e.g. be parameters corresponding to maximum actuator acceleration so as to ensure the stability and integrity of the vehicle. Similarly, hydraulic limitation parameters may e.g. be parameters corresponding to maximum actuator jerk to ensure driver comfort and to ensure stability and integrity of the vehicle. Here it is preferred that hydraulic limitation parameters are determined and sent to lower previously set maximum values if the bucket load and/or other loads on the hydraulic system 140 exceed a predetermined threshold value, e.g. an empirically determined threshold values, and/or predetermined and/or continuously calculated threshold values. The threshold values may e.g. be calculated based on the specific design of the vehicle and the operational status of the vehicle including but not limited to prediction of the next value of said acceleration and/or jerk based on values from the operator controls 220 read by the hydraulic system control unit 200 in the fourth step 4. Hydraulic limitation parameters may also be determined and sent to lower previously set maximum values if near-end positions of the hydraulic piston is detected. Conversely, it is preferred that hydraulic limitation parameters are determined and sent so as to raise the previously set maximum values if said loads fall below likewise predetermined and/or calculated threshold values. In addition, hydraulic limitation parameters may be determined and sent as a response to the driver actuating a control among the operator controls 220. The driver may e.g. be able to adjust the maximum actuator jerk by actuating the operator controls 220 so as to fit the driver comfort to an individual preference.

In addition, the hydraulic limitation parameters may be parameters e.g. corresponding to maximum actuator force (N) and/or maximum pump torque (Pa) and/or maximum actuator velocity (m/s) and/or maximum pump angular velocity (rpm) or parameters similar to those now mentioned. This is also to ensure stability and integrity of the vehicle inner and/or outer strains and at end-positions for the pistons of the hydraulic cylinders. Here it is preferred that hydraulic limitation parameters are determined and sent to lower previously set maximum values if said force, torque and/or velocities exceed predetermined threshold values, e.g. empirically determined threshold values, and/or predetermined and/or continuously calculated threshold values. The threshold values may e.g. be calculated based on the specific design of the vehicle and the operational status of the vehicle including but not limited to prediction of the next value of said force, torque and/or velocities based on values from the operator controls 220 read by the hydraulic system control unit 200 in the fourth step 4. Hydraulic limitation parameters may also be determined and sent to lower previously set maximum values if near-end positions of the hydraulic piston is detected. Conversely, it is preferred that hydraulic limitation parameters are determined and sent so as to raise the previously set maximum values if said force, torque and/or velocities fall below likewise predetermined and/or calculated threshold values. In addition, hydraulic limitation parameters may be determined and sent as a response to the driver actuating a control among the operator controls 220.

Moreover, hydraulic limitation parameters may e.g. be parameters corresponding to maximum power available for the hydraulic system 140, 140'. The power available for the for the hydraulic system 140, 140' may be determined by the state of charge or similar of the electrical power storage arrangement 210, the power currently available from the combustion engine 120 and/or the generator 230, the power required by the transmission line 110, the power required from the electrical system of the wheel loader 1 etc.

Here it is preferred that hydraulic limitation parameters are determined and sent e.g. if the maximum power available for the hydraulic system falls below a predetermined threshold value, e.g. an empirically determined threshold value, and/or a predetermined and/or continuously calculated threshold value. The threshold value may e.g. be calculated based on the specific design of the vehicle and the operational status of the vehicle including but not limited to prediction of the next value of said maximum available power based on values from the operator controls 220 read by the hydraulic system control unit 200 in the fourth step 4. Conversely it is preferred that hydraulic limitation parameters are determined and sent so as to raise the previously set maximum values if said maximum power available for the hydraulic system raise above a likewise predetermined and/or calculated threshold value.

Before we proceed the following should perhaps also be clarified regarding the current operational status of the wheel loader 1. Loads on the bucket 3 and other loads exerted on hydraulic system 140 may e.g. be measured by strain sensors (e.g. a strain gauge) and/or torque sensors comprised by the sensor arrangements 242a-242e as described above. Similarly or alternatively, loads on the bucket 3 and other loads exerted on hydraulic system 140 may e.g. be measured by pressure sensors comprised by the sensor arrangements 242a-242e as described above. Moreover, the position of the piston oldie hydraulic cylinders 5a, 5b, 6, 7a, 7b can be measured by the sensor arrangements 242a-242e comprising position sensors as described above. Furthermore, the state of charge or similar of the electrical power storage arrangement 210, the power currently available from the combustion engine 120 and/or the generator 230, the power required by the transmission line 110, the power required from the electrical system of the wheel loader 1 etc may e.g. be obtained by the hydraulic system control unit 200 using a CAN-bus or similar connected to the central functions of the wheel loader 1 as described above. Information about such powers and/or representations thereof is typically available to the central functions of the wheel loader 1 and/or can be readily made available by the central functions on said CAN-bus or similar.

In a fifth step S5 of the exemplifying method it is preferred that the hydraulic system control information obtained by the hydraulic system control unit 200 in the fourth step S4 is sent by the hydraulic system control unit 200 to the hydraulic system 140 for execution, or more preferably to the machine control unit 141 or similar of the hydraulic system 140. The machine control unit 141 then generates the appropriate command(s) to the affected electrical machine(s) 143, 145 and/or 147 such that the condition(s) defined by the hydraulic system control information is/are met and/or satisfied.

In a sixth step S6 of the exemplifying method it is preferred that the hydraulic system control unit 200 determines whether the operator controls 220 are still in operation, which e.g. may be performed by sending a request to the operator controls 220 via a CAN-bus or similar as previously described.

If it is determined that the operator controls 220 is still in operation it is preferred that the method described above returns to the second step S2, being described in more detail above. Conversely, if it is determined that the operator controls 220 is not in operation it is preferred that the method proceeds to a seventh step S7 wherein the hydraulic system 140 is set to an idle state by the hydraulic system control unit 200 sending idle hydraulic system control information to the machine control unit 141. The idle hydraulic system control information may e.g. comprise information that causes the machine control unit 141 to ramp down the activity of the electrical machines 142, 144, 146. The method is then stopped in an eight step S8.

It is to be understood that the present invention is not limited to the embodiments described above and illustrated in the drawings rather, the skilled person will recognize that many changes and modifications may be made within the scope of the appended claims.

The invention claimed is:

1. A method for operating a working machine provided with a hydraulic system for moving an implement on the working machine and/or for steering the working machine, and an operator control means, which is adapted to command actuation of the hydraulic system, wherein the method in a first control unit comprises:
receiving first information regarding a status of the driver controlled operator control means,
determining, via a processor, at least one hydraulic system control information based on the first information, and
sending the determined hydraulic system control information to a second control unit, which is adapted to control the hydraulic system accordingly, wherein the at least one hydraulic system control information comprises limitation information for limiting the controlling of the moving and/or steering,
sending initial predetermined hydraulic system limitation information for limiting the controlling of the moving and/or steering at start up of the working machine from the first control unit to the second control unit.

2. The method according to claim 1, wherein:
the at least one hydraulic system control information comprises command information for controlling the moving and/or steering.

3. The method according to claim 1, comprising:
receiving second information regarding a current operational status of the working machine,
determining at least one hydraulic system control information based on the second information, or based on the first information and the second information.

4. The method according to claim 1, comprising:
determining at least one hydraulic system control information comprising limitation information based on the first information.

5. A method for operating a working machine provided with a hydraulic system for moving an implement on the working machine and/or for steering the working machine, and an operator control means, which is adapted to command actuation of the hydraulic system, wherein the method in a first control unit comprises:
receiving first information regarding a status of the driver controlled operator control means,
determining, via a processor, at least one hydraulic system control information based on the first information,
sending the determined hydraulic system control information to a second control unit, which is adapted to control the hydraulic system accordingly, wherein the at least one hydraulic system control information comprises limitation information for limiting the controlling of the moving and/or steering, and
sending hydraulic system limitation information for limiting the controlling of the moving and/or steering determined during operation of the working machine from the first control unit to the second control unit.

6. The method according to claim 1, wherein the limitation information comprises a maximum value for at least one operational parameter.

7. The method according to claim 1, wherein the limitation information comprises a minimum value for at least one operational parameter.

8. A method for operating a working machine provided with a hydraulic system for moving an implement on the working machine and/or for steering the working machine, and an operator control means, which is adapted to command actuation of the hydraulic system, wherein the method in a first control unit comprises:
receiving first information regarding a status of the driver controlled operator control means,
determining, via a processor, at least one hydraulic system control information based on the first information,
sending the determined hydraulic system control information to a second control unit, which is adapted to control the hydraulic system accordingly, wherein the at least one hydraulic system control information comprises limitation information for limiting the controlling of the moving and/or steering,
wherein the limitation information defines at least one limitation for a hydraulic actuator acceleration and/or jerk.

9. The method according to claim 1, wherein the limitation information defines a maximum power available for the hydraulic system.

10. The method according to claim 1, wherein the limitation information defines at least one limitation for controlling a pump.

11. A method for operating a working machine provided with a hydraulic system for moving an implement on the working machine and/or for steering the working machine, and an operator control means, which is adapted to command actuation of the hydraulic system, wherein the method in a first control unit comprises:
receiving first information regarding a status of the driver controlled operator control means,
determining, via a processor, at least one hydraulic system control information based on the first information, and
sending the determined hydraulic system control information to a second control unit, which is adapted to control the hydraulic system accordingly, wherein the at least one hydraulic system control information comprises limitation information for limiting the controlling of the moving and/or steering,
wherein the at least one hydraulic system control information comprises command information for controlling the moving and/or steering, and the command information for controlling the moving and/or steering is indicative of an actuator speed, an actuator force and/or torque, a difference in volumetric flow rate over an actuator or a difference in pressure over an actuator.

12. A method for operating a working machine provided with a hydraulic system for moving an implement on the working machine and/or for steering the working machine, and an operator control means, which is adapted to command actuation of the hydraulic system, wherein the method in a first control unit comprises:
receiving first information regarding a status of the driver controlled operator control means,
determining, via a processor, at least one hydraulic system control information based on the first information,
sending the determined hydraulic system control information to a second control unit, which is adapted to control the hydraulic system accordingly, wherein the at least one hydraulic system control information comprises limitation information for limiting the controlling of the moving and/or steering,
receiving, second information regarding a current operational status of the working machine, and determining, via a processor, at least one hydraulic system control information based on the second information, or based on the first information and the second information, wherein the second information regarding a current operational status of the working machine is indicative of status of a power source, a status of a transmission line, a status of a wheel and/or a status of an electrical power storage arrangement.

13. The method according to claim 1, wherein the method in the second control unit comprises at least one of controlling a pressure in a hydraulic cylinder in the hydraulic system, a power provided to and/or from an electrical machine adapted to control a pump in the hydraulic system, and/or a rotational position and/or speed of the electrical machine.

14. A method for operating a working machine provided with a hydraulic system for moving an implement on the working machine and/or for steering the working machine, and an operator control means, which is adapted to command actuation of the hydraulic system, wherein the method in a first control unit comprises:

receiving first information regarding a status of the driver controlled operator control means, determining, via a processor, at least one hydraulic system control information based on the first information, sending the determined hydraulic system control information to a second control unit, which is adapted to control the hydraulic system accordingly, and operating the second control unit substantially faster compared to the operating of the first control unit.

15. A method for operating a working machine provided with a hydraulic system for moving an implement on the working machine and/or for steering the working machine, and an operator control means, which is adapted to command actuation of the hydraulic system, wherein the method in a first control unit comprises:

receiving first information regarding a status of the driver controlled operator control means, determining, via a processor, at least one hydraulic system control information based on the first information, sending the determined hydraulic system control information to a second control unit, which is adapted to control the hydraulic system accordingly, sending, the hydraulic system control information at the first control unit so as to close a first control loop for controlling the second control unit, and receiving and utilizing the hydraulic system control information at the second control unit so as to close a second control loop for controlling the hydraulic system.

16. The method according to claim 1, wherein the limitation information comprises a maximum actuator force parameter.

* * * * *